(No Model.)

E. H. BROWN.
CLUTCH AND BRAKE.

No. 367,090. Patented July 26, 1887.

WITNESSES:
N. R. Worthington
J. C. Houran

INVENTOR:
EUGENE H. BROWN.
By Franklin Scott, Atty.

UNITED STATES PATENT OFFICE.

EUGENE H. BROWN, OF BENNINGTON, VERMONT.

CLUTCH AND BRAKE.

SPECIFICATION forming part of Letters Patent No. 367,090, dated July 26, 1887.

Application filed April 27, 1887. Serial No. 236,284. (No model.)

*To all whom it may concern:*

Be it known that I, EUGENE H. BROWN, of Bennington, in the county of Bennington and State of Vermont, have invented certain Improvements in Combined Brake and Clutch, of which the following description, in connection with the accompanying single sheet of drawings, constitutes a specification.

This invention is designed for use in connection with sewing-machines which are driven by other than foot or hand power and is interposed between the driving-shaft and the machine. It embraces provisions for operating a clutch for driving the machinery and a brake for stopping the same when the clutch is thrown out of engagement; also special lubricating devices used in connection therewith.

The invention may be used with other than sewing-machines, if desired.

Figure 1:
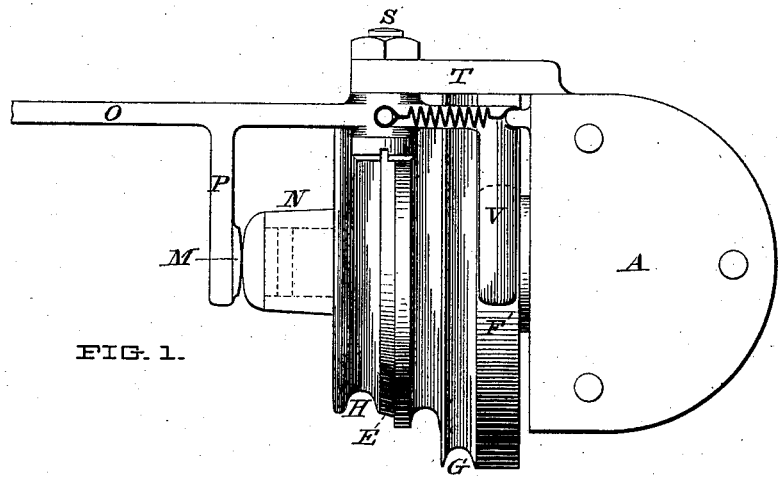
Figure 2:
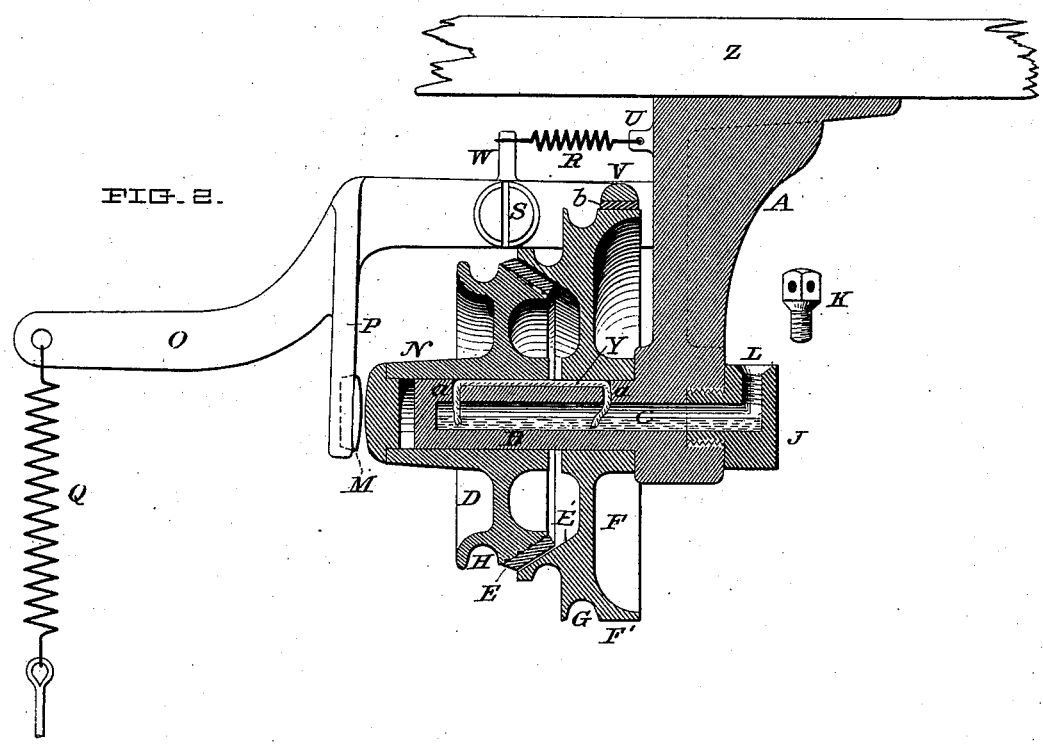

Figure 1 is a plan view, and Fig. 2 is a vertical section.

The invention consists of a hanger, A, which is fastened to the under side of the table Z, upon which the mechanism of the sewing or other machine rests. This hanger has a stud or spindle, B, turned up for the reception of driving cone friction-pulley D and of the driven cone friction-pulley F. Stud B is chambered, as at C, to receive lubricant. It is also longitudinally grooved on its upper side for the reception of a wick or oil-conductor, Y, which may be of leather, rawhide, or other suitable material, the ends of which pass through the perforations *a a* into the oil-chamber C. By means of wick Y, which is constantly saturated with oil, the journal-stud and pulleys are kept constantly lubricated. Chamber C is made by boring stud B from either end and then closing the end of the hole with a plug and boring a supply or filling hole from any accessible part of the exterior into said chamber. In this instance I have tapped the plug at L for a filling-duct, and have provided the screw-plug K, wherewith to close the orifice L, to exclude dirt, &c. Oil-chamber C, with wick Y, has capacity to carry oil and lubricate the pulleys for many months at a time.

The pulleys D and F are respectively male and female, the cone face of the male being covered with leather, E, or other suitable material, which acts as a cushion and serves to render its action noiseless. The hub N of the driver projects beyond the outer end of stud B, and is fitted to be acted against by the pad M on arm P of lever O. It is fitted to run easily on stud B and to slide freely thereon into and out of engagement with pulley F. Pulley D has a belt-groove, H, which takes on the driving-belt from the main driver, and the leather cone face is fitted to engage by frictional contact with the cone face E' of the pulley F. Pulley F has a brake-rim, F', and a belt-groove, G, to receive the belt which connects with the driving-pulley of the sewing or other machine. The brake-rim F' is acted on by the brake V, which is an arm projecting from the brake-lever O, and has its bearing-point faced with leather or other wearing material, *b*. Brake-lever O is pivoted on pivot-bolt S, which is attached to a bracket-arm, T, of the hanger A, and by means of spring-connection Q is attached to a foot-pedal, whereby its action may be controlled. The bracket P is provided with a wearing pad or cushion, M, made of rawhide, leather, or other suitable material, and is adapted to impinge against the outer end of the hub of cone-pulley D. When the tension on the spring-connection Q is released, the retractile spring R, which connects lug W of lever O with lug U of the stand, comes into action and draws lever O up, and causes the brake V to bear against brake-rim F' of the pulley F, whereby the machine is speedily brought to rest without other attention of the operator.

It will be seen that depressing the long arm of lever O brings pad M to bear against the hub of pulley D and forces its cone face into engagement with the cone face of pulley F, thus starting the machine, and the same action of the lever releases the brake V from its grip on pulley F. The function of spring Q is to maintain an equable tension or pressure between the two cone faces of the pulleys; hence

I claim as my invention—

1. The combination of hanger A, having spindle-stud B cast integral therewith, chambered for an oil-reservoir, and provided with a capillary lubricating-wick, as shown, and the bracket T, with the male and female friction cone-pulleys D and F, and lever O, pivoted on bracket T, provided with arm P and brake-pad V, and connected by springs R and Q with hanger A, substantially in the manner described, and for the purposes set forth.

2. The combination of hanger A, having the stud B chambered and provided with a capillary lubricating-wick, as shown, said chamber being closed at one end and provided with an aperture for filling the same, with pulleys F and D, the latter having a hub projecting beyond the end of stud B, and lever O, provided with arm P, which is fitted with the pad M, which is adapted to bear against the end of the hub of pulley D, in the manner described, and for the purposes set forth.

In testimony whereof I have hereto subscribed my name, at Bennington, Vermont, this 13th day of January, A. D. 1887.

EUGENE H. BROWN.

In presence of—
FRANKLIN SCOTT,
F. W. OLIN.